(12) United States Patent
Rakich et al.

(10) Patent No.: US 9,063,354 B1
(45) Date of Patent: Jun. 23, 2015

(54) PASSIVE THERMO-OPTIC FEEDBACK FOR ROBUST ATHERMAL PHOTONIC SYSTEMS

(75) Inventors: Peter T. Rakich, Albuquerque, NM (US); Michael R. Watts, Hingham, MA (US); Gregory N. Nielson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 627 days.

(21) Appl. No.: 13/368,127

(22) Filed: Feb. 7, 2012

(51) Int. Cl.
G02B 6/12 (2006.01)
G02F 1/01 (2006.01)
G02B 6/293 (2006.01)
G02B 6/35 (2006.01)

(52) U.S. Cl.
CPC .............. *G02F 1/01* (2013.01); *G02B 6/29389* (2013.01); *G02B 6/3582* (2013.01); *G02B 6/35* (2013.01); *G02B 6/3576* (2013.01)

(58) Field of Classification Search
USPC ............................ 385/14, 16, 27; 398/83, 85
See application file for complete search history.

(56) References Cited

U.S. PATENT DOCUMENTS

| | | | |
|---|---|---|---|
| 5,024,923 A * | 6/1991 | Suzuki et al. | 430/372 |
| 5,080,504 A * | 1/1992 | Partain et al. | 385/17 |
| 6,493,478 B1 * | 12/2002 | DeRosa et al. | 385/16 |
| 6,636,668 B1 | 10/2003 | Al-hemyari | |
| 6,888,973 B2 | 5/2005 | Kolodziejski | |
| 7,356,221 B2 | 4/2008 | Chu | |
| 7,783,144 B2 | 8/2010 | Chigrinov | |
| 2002/0171915 A1 * | 11/2002 | Bartolini et al. | 359/337.1 |
| 2003/0210848 A1 * | 11/2003 | Troll | 385/16 |
| 2004/0179851 A1 * | 9/2004 | Kandpal et al. | 398/149 |
| 2004/0234198 A1 * | 11/2004 | Wagner et al. | 385/27 |
| 2005/0082480 A1 * | 4/2005 | Wagner et al. | 250/338.1 |
| 2005/0218328 A1 * | 10/2005 | Suzuki et al. | 250/353 |
| 2008/0050127 A1 * | 2/2008 | Sommer et al. | 398/212 |
| 2009/0022453 A1 * | 1/2009 | Ueno et al. | 385/16 |
| 2009/0169149 A1 * | 7/2009 | Block | 385/9 |
| 2010/0027099 A1 * | 2/2010 | McCarthy et al. | 359/288 |
| 2010/0288947 A1 * | 11/2010 | McCarthy et al. | 250/517.1 |

(Continued)

OTHER PUBLICATIONS

"0.48Tb/s (12×40Gb/s) WDM transmission and high-quality thermo-optic switching in dielectric loaded plasmonics", by D. Kalavrouziotis et all; Received Dec. 12, 2011; revised Jan. 20, 2012; accepted Jan. 30, 2012; published Mar. 20, 2012 (C) 2012 OSA Mar. 26, 2012 / vol. 20, No. 7 / Optics Express 7655.*

(Continued)

*Primary Examiner* — Ryan Lepisto
*Assistant Examiner* — Guy Anderson
(74) *Attorney, Agent, or Firm* — Martin I. Finston

(57) ABSTRACT

Thermal control devices, photonic systems and methods of stabilizing a temperature of a photonic system are provided. A thermal control device thermally coupled to a substrate includes a waveguide for receiving light, an absorption element optically coupled to the waveguide for converting the received light to heat and an optical filter. The optical filter is optically coupled to the waveguide and thermally coupled to the absorption element. An operating point of the optical filter is tuned responsive to the heat from the absorption element. When the operating point is less than a predetermined temperature, the received light is passed to the absorption element via the optical filter. When the operating point is greater than or equal to the predetermined temperature, the received light is transmitted out of the thermal control device via the optical filter, without being passed to the absorption element.

26 Claims, 13 Drawing Sheets

(56) References Cited

U.S. PATENT DOCUMENTS

| | | |
|---|---|---|
| 2010/0296103 A1 | 11/2010 | Smith |
| 2011/0102804 A1* | 5/2011 | Lipson et al. ............... 356/480 |
| 2011/0235962 A1* | 9/2011 | Shubin et al. ............... 385/14 |
| 2012/0000600 A1* | 1/2012 | Finot et al. ............... 156/263 |
| 2012/0275007 A1* | 11/2012 | Gu et al. ............... 359/244 |
| 2014/0193113 A1* | 7/2014 | Akiyama, Tomoyuki ........ 385/2 |

OTHER PUBLICATIONS

"Thermo-optic plasmo-photonic mode interference switches based on dielectric loaded waveguides" by K. Hassan, et al; Applied Physics Letters 99, 241110 (2011).*

"All-plasmonic switching based on thermal nonlinearity in a polymer plasmonic microring resonator" by David Perron et al; Jul. 15, 2011 / vol. 36, No. 14 / Optics Letters.*

"Compact and low power thermo-optic switch using folded silicon waveguides" by Adam Densmore et al; (C) 2009 OSA Jun. 22, 2009 / vol. 17, No. 13 / Optics Express 10457.*

"A 320 Gb/s-Throughput Capable 2 2 Silicon-Plasmonic Router Architecture for Optical Interconnects" by Sotirios Papaioannou et al; Journal of Lightwave Technology, vol. 29, No. 21, Nov. 1, 2011.*

"2D Photonic crystal thermo-optic switch based on AlGaAs/GaAs epitaxial structure" by Edilson A. Camargo et al; Feb. 23, 2004 / vol. 12, No. 4 / Optics Express 588.*

\* cited by examiner

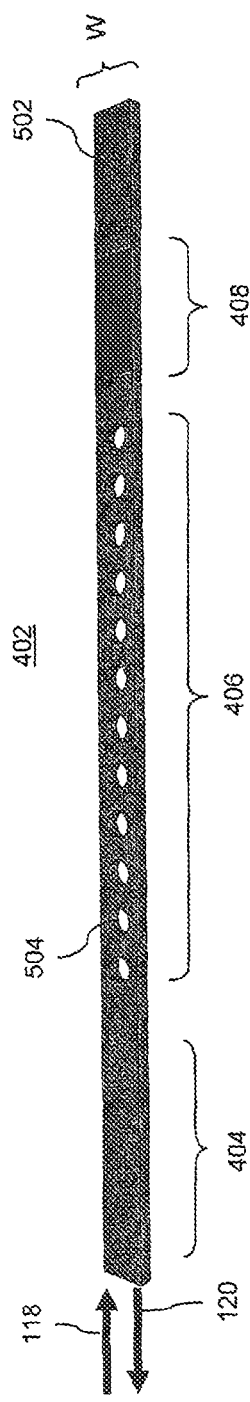
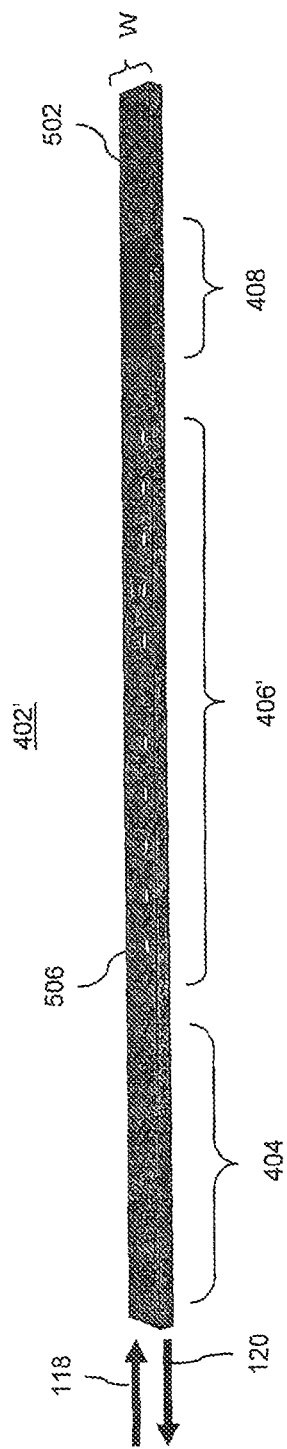
FIG. 5A
FIG. 5B

PASSIVE THERMO-OPTIC FEEDBACK FOR ROBUST ATHERMAL PHOTONIC SYSTEMS

STATEMENT REGARDING FEDERALLY SPONSORED RESEARCH

This invention was developed under Contract DE-AC04-94AL85000 between Sandia Corporation and the U.S. Department of Energy. The U.S. Government has certain rights in this invention.

FIELD OF THE INVENTION

The present invention relates to the field of photonic devices and, more particularly, to thermal control devices for stabilizing a temperature of a photonic system by passive thermo-optic feedback.

BACKGROUND OF THE INVENTION

Integrated photonic circuits are capable of integrating multiple photonic devices and components for various functions, such as transporting, focusing, multiplexing, demultiplexing, splitting, combining, polarizing, isolating, coupling, switching, filtering, modulating, detecting and generating light. Integrated photonic circuits may combine several of these functions onto a common chip or substrate. Photonic elements of photonic devices are typically silicon-based or silicon nitride-based. The photonic devices and components may be fabricated on a variety of substrates, including silicon.

Silicon-based photonics, however, may be very sensitive to temperature. For example, the sensitivity of silicon is typically about 100 GHz per degree Celsius. The sensitivity of silicon nitride is typically about several GHz per degree Celsius. Accordingly, a resonance frequency of silicon-based photonic elements (for example, optical waveguides and microresonators) may shift with variation in temperature. It is typically difficult to control thermal flow in micrometer-sized silicon-based photonic elements, because silicon is a good thermo-conductive material. Furthermore, because silicon is thermo-conductive, there may also be thermal-induced crosstalk between neighboring devices in the integrated circuit. Accordingly, it is desirable to stabilize the temperature of the photonic system.

SUMMARY OF THE INVENTION

The present invention is embodied in a thermal control device. The thermal control device is thermally coupled to a substrate and includes a waveguide for receiving light, an absorption element optically coupled to the waveguide for converting the received light to heat and an optical filter. The optical filter is optically coupled to the waveguide and thermally coupled to the absorption element. An operating point of the optical filter is tuned responsive to the heat from the absorption element. When the operating point of the optical filter is less than a predetermined temperature, the received light is passed to the absorption element via the optical filter. When the operating point of the optical filter is greater than or equal to the predetermined temperature, the received light is transmitted out of the thermal control device via the optical filter, without being passed to the absorption element.

The present invention is also embodied in a photonic system. The photonic system includes a light source for generating light having at least one wavelength and a thermal control device thermally coupled to an isothermal region of a photonic chip. The thermal control device includes an optical filter configured to receive the light from the light source and an absorption element for converting the received light to heat. The optical filter is thermally coupled to the absorption element. An operating point of the optical filter is tuned responsive to the heat from the absorption element to selectively transfer heat from the absorption element to the isothermal region. When the operating point of the optical filter is less than a predetermined temperature, the received light is passed to the absorption element via the optical filter. When the operating point of the optical filter is greater than or equal to the predetermined temperature, the received light is transmitted out of the thermal control device via the optical filter, without being passed to the absorption element.

The present invention is further embodied in a method of stabilizing a temperature of a photonic system. The method includes receiving light by an optical filter and selectively passing the received light to an absorption element responsive to an operating point of the optical filter. The optical filter is thermally coupled to the absorption element such that the operating point of the optical filter is tuned responsive to heat from the absorption element. When the operating point of the optical filter is less than a predetermined temperature, the received light is passed to the absorption element via the optical filter and the received light is converted to the heat by the absorption element to transfer heat to the photonic system. When the operating point of the optical filter is greater than or equal to the predetermined temperature, the received light is transmitted out of the photonic system via the optical filter, without passing the received light to the absorption element, to reduce the temperature of the photonic system.

BRIEF DESCRIPTION OF THE DRAWINGS

The invention may be understood from the following detailed description when read in connection with the accompanying drawing. It is emphasized, according to common practice, that various features of the drawings may not be drawn to scale. On the contrary, the dimensions of the various features may be arbitrarily expanded or reduced for clarity. Moreover, in the drawing, common numerical references are used to represent like features. Included in the drawing are the following figures:

FIGS. 5A and 5B are perspective view diagrams of the thermal control device shown in FIG. 4, according to embodiments of the present invention;

DETAILED DESCRIPTION OF THE INVENTION

Aspects of the present invention relate to thermal control devices and methods of stabilizing a temperature of a photonic system. Exemplary thermal control devices may include a waveguide for receiving light, an absorption element for converting the received light to heat and an optical filter. The optical filter may be thermally coupled to the absorption element and may be optically coupled to the waveguide. An operating point of the optical filter may be tuned responsive to heat from the absorption element. Based on the operating point of the optical filter, the received light may be transmitted out of the thermal control device without being passed to the absorption element, or the received light may be passed to the absorption element such that heat from the thermal control device may be transferred to the photonic system.

According to aspects of the present invention, energy carried by the incident light may be used as a heat source by exemplary thermal control devices. Exemplary thermal control devices may provide passive thermo-optic feedback, via the absorption element and the optical filter, to control the temperature of the photonic system. According to an embodiment of the present invention, an exemplary thermal control device may control a temperature of adjacent photonic elements of the photonic system, as well as a temperature of a substrate of the photonic system. According to another embodiment, a plurality of thermal control devices may be distributed across a photonic chip, to control a temperature of various regions of the chip. According to another embodiment, a plurality of optical filters and absorption elements may be combined to transfer a suitable amount of heat for temperature control of a photonic system.

According to embodiments of the present invention, a passive thermo-optic mechanism (i.e., without electronic components) may be used to control the temperature of a substrate (such as photonic chip), as well as photonic elements on the substrate. The passive thermo-optic feedback may be achieved through a thermal switching behavior of the incident light, by changing the operating point of a thermally tunable optical filter. An exemplary thermal control device may, thus, produce a thermally self-limiting system which regulates its own temperature. Accordingly, photonic systems including exemplary thermal control devices may be used to provide thermally-insensitive microphotonic elements, potentially alleviating the severe fabrication sensitivities pervasive in silicon-based photonics.

Figure 1:
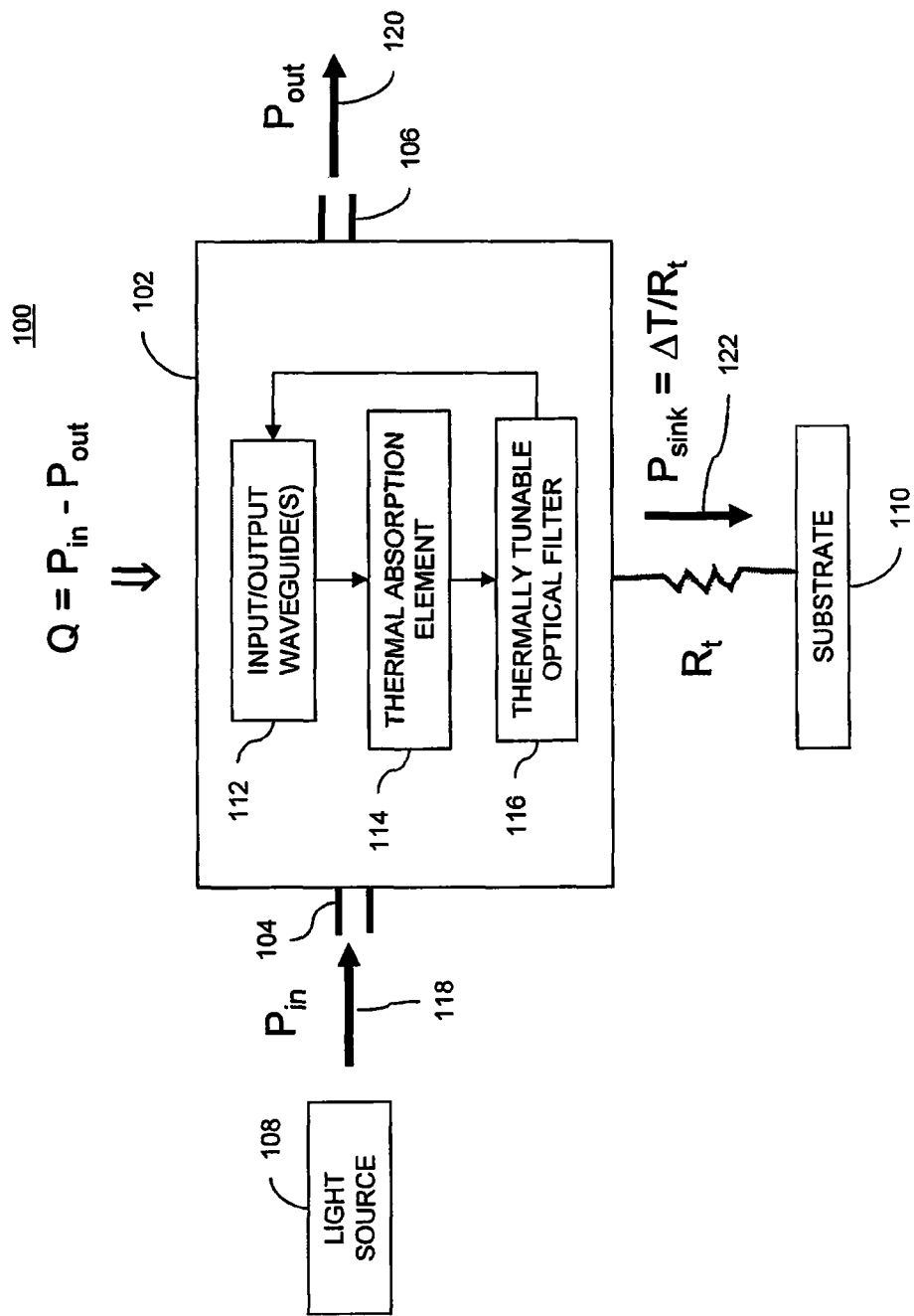
FIG. 1 is a functional block diagram of an exemplary photonic system, according to an embodiment of the present invention.

Referring to FIG. 1, a functional block diagram of exemplary photonic system 100 is shown. System 100 includes thermal control device 102 thermally coupled to substrate 110 via thermal resistance $R_t$. Although not shown, photonic system 100 may include other photonic devices (i.e., devices having one or more photonic elements) as well as other components which may be thermally coupled to thermal control device 102 via substrate 110. Examples of other components of photonic system 100 may include electrical devices (e.g., transistors), microelectromechanical (MEMS) devices (e.g., mirrors) or optoelectronic devices (e.g., detectors, amplifiers, modulators, light emitting diodes (LEDs) or lasers). Examples of photonic systems having additional photonic devices are described further below with respect to FIGS. 10 and 12.

Thermal control device 102 may be configured to receive input light 118 having input power $P_{in}$ from light source 108 via input port 104. Thermal control device 102 may be configured to transmit output light 120 having output power $P_{out}$ via output port 106. Thermal control device 102 may also be configured to provide transferred heat 122 having power $P_{SINK}$ to substrate 110 via thermal resistance $R_t$.

Input light 118 may include monochromatic light, or light having more than one wavelengths, including broadband light. Light source 108 may include any suitable light source, such as, but not limited to, semiconductor light sources (e.g., LEDs, superluminescent diodes, and lasers), fluorescent lamps, incandescent light sources and thermal light sources.

Substrate 110 may receive transferred heat 122 and may function as a heat sink. Substrate may include any suitable material including, but not limited to, silicon, indium phosphide, germanium, silica, fused quartz, sapphire, alumina, glass, gallium arsenide, silicon carbide, lithium niobate, silicon on insulator, germanium on insulator and silicon germanium.

Figure 5C:
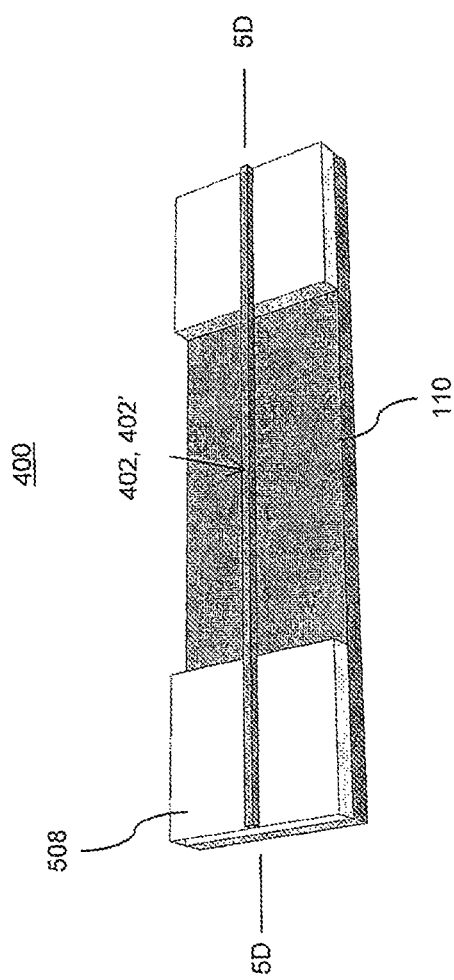
FIGS. 5C and 5D are respective perspective view and cross-section view diagrams of the photonic system shown in FIG. 4, according to an embodiment of the present invention.
Figure 5D:
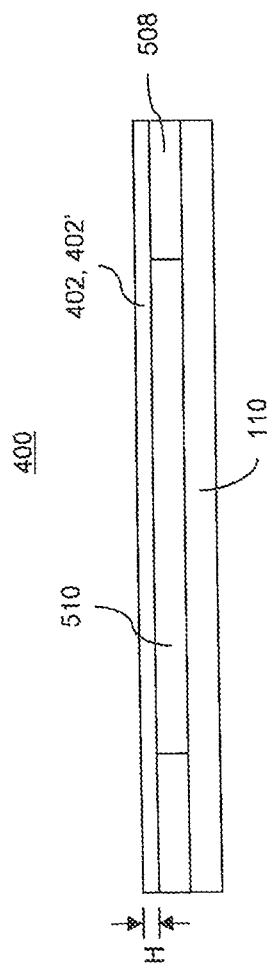

Thermal resistance $R_t$ may be any suitable mechanical element which may thermally couple thermal control device 102 to substrate 110. Thermal resistance $R_t$ may be selected to produce a temperature difference $\Delta T$ between thermal control device 102 and substrate 110. For example, thermal resistance $R_t$ may include a membrane on which thermal control device 102 may be seated, one or more anchoring points to suspend thermal control device 102 above substrate 110 (as shown in FIGS. 5C and 5D) or an oxide disposed between thermal control device 102 and substrate 110.

Under steady-state conditions, the output power $P_{out}$ is typically less than the input power $P_{in}$, meaning that the remaining power is typically converted into heat (Q) as:

$$Q = P_{in} - P_{out} \quad (1)$$

Thus, Q represents the rate of power dissipated within thermal control device 102. Accordingly, under steady-state conditions, power $P_{SINK}$ of transferred heat 122 may be represented as:

$$P_{SINK} Q = \Delta T / R_t = P_{in} - P_{out}. \quad (2)$$

Thermal control device 102 may include input/output waveguide 112, thermal absorption element 114 and thermally tunable optical filter 116. Thermal absorption element 114 may be optically coupled to input/output waveguide 112, to convert input light 118 to heat Q. Optical filter 116 may be thermally coupled to thermal absorption element 114 and optically coupled to input/output waveguide 112. As described further below, an operating point of optical filter 116 may be tuned to control whether heat is generated (by thermal absorption element 114) and provided to substrate 110 as transferred heat 122.

Input/output waveguide 112 may represent one waveguide coupled between input port 104 and output port 106, or may include a separate input waveguide and a separate output waveguide coupled to respective input port 104 and output port 106. Examples of input/output waveguide 112 are described further below with respect to FIGS. 4 and 7.

Suitable input/output waveguides 112, thermal absorption elements 114 and thermally tunable optical filters 116 may be understood by the skilled person from the description herein.

Figure 2:
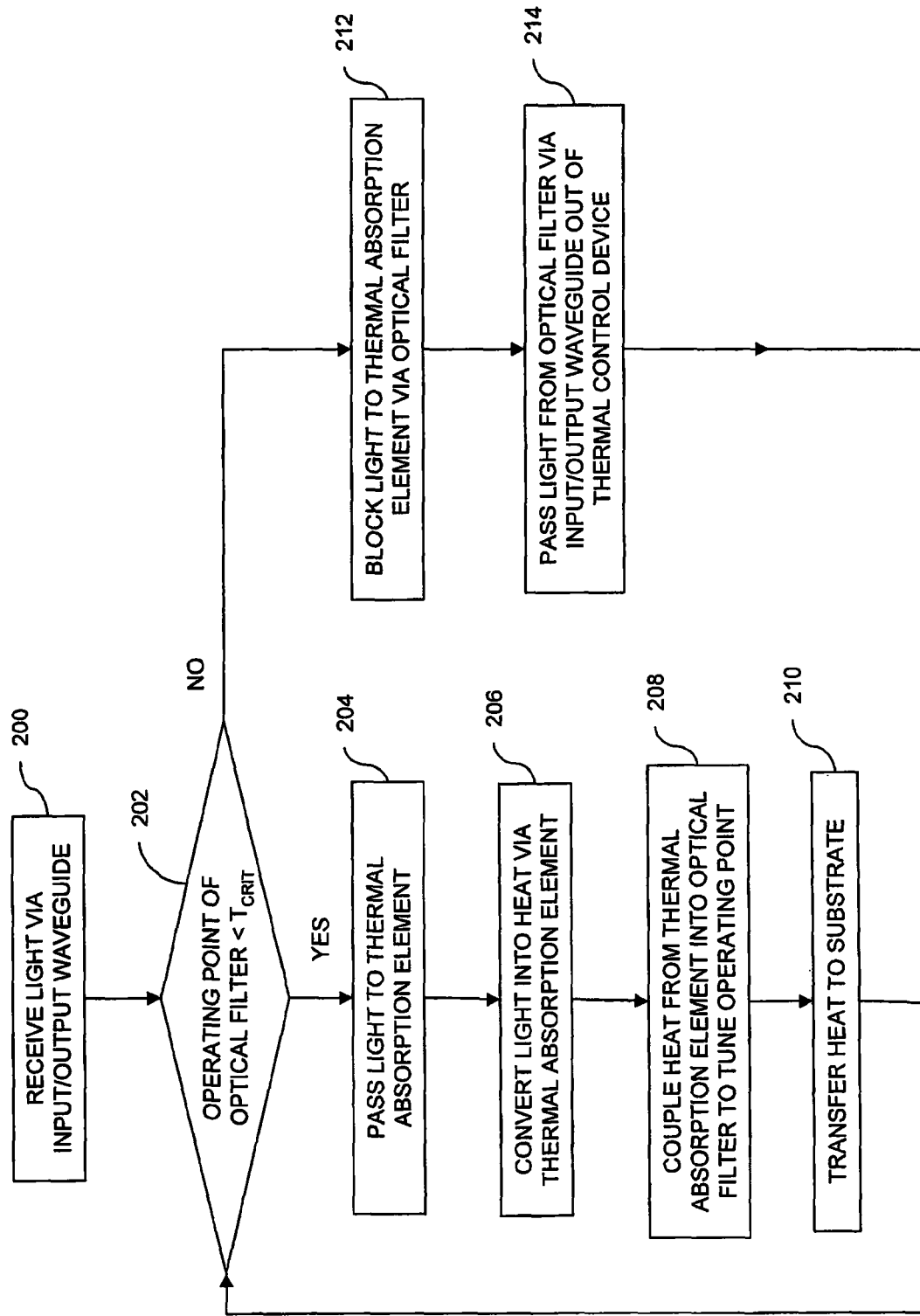
FIG. 2 is a flow chart diagram illustrating an exemplary method of stabilizing a temperature of a photonic system, according to an embodiment of the present invention.
Figure 3B:
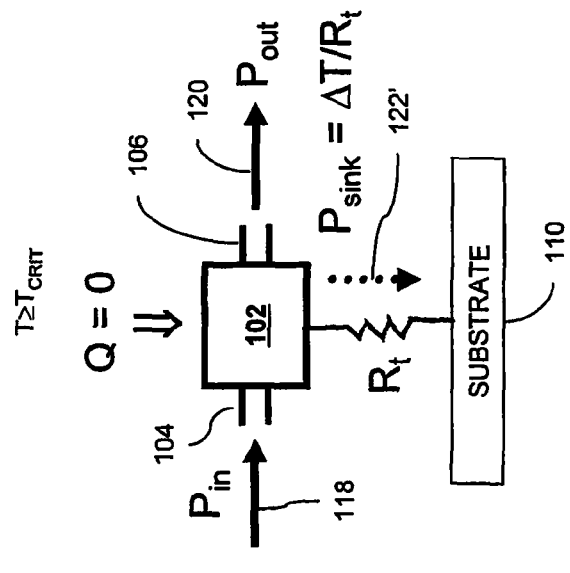
FIGS. 3A and 3B are functional block diagrams of an exemplary thermal control device of the photonic system shown in FIG. 1, illustrating operation of the thermal control device below and above a critical temperature, according to an embodiment of the present invention.

Referring next to FIGS. 1-3B, an exemplary method of stabilizing a temperature of photonic system 100 (FIG. 1) is described, according to an embodiment of the present invention. In particular, FIG. 2 is a flow chart diagram illustrating the exemplary method; FIG. 3A is a functional block diagram of thermal control device 102, illustrating operation of thermal control device 102 below critical temperature $T_{CRIT}$; and FIG. 3B is a functional block diagram of thermal control device 102, illustrating operation of thermal control device 102 at or above $T_{CRIT}$. The steps illustrated in FIG. 2 represent an example embodiment of the present invention. It is understood that certain steps may be performed in an order different from what is shown. It is also understood that certain steps may be performed synchronous with each other.

At step 200, input light 118 is received via input/output waveguide 112, for example, from light source 108. At step 202, it is determined whether the operating point of optical filter 116 is less than a critical temperature $T_{CRIT}$. As described further below with respect to FIGS. 6A and 9A, the operating point of optical filter 116 may be passively adjusted via heat from thermal absorption element 114. The operating point of optical filter 116 may also selected based on one or more wavelengths of input light 118 provided to thermal control device 102. Accordingly, depending upon the operating point of optical filter 116 relative to the wavelength of input light 118, thermal control device 102 may operate as a thermal switch.

At step 202, if it is determined that the operating point of optical filter 116 is less than critical temperature $T_{CRIT}$, step 202 proceeds to step 204. At step 204, optical filter 116 may pass light from input/output waveguide 112 to thermal absorption element 114. At step 206, thermal absorption element 114 may convert the received light into heat. At step 208, heat from thermal absorption element 114 may be coupled into optical filter 116, which may change the operating point of optical filter 116. At step 210, heat from thermal absorption element 114 may be transferred to substrate 110 as transferred heat 122. Step 210 may proceed to step 202.

Figure 3A:
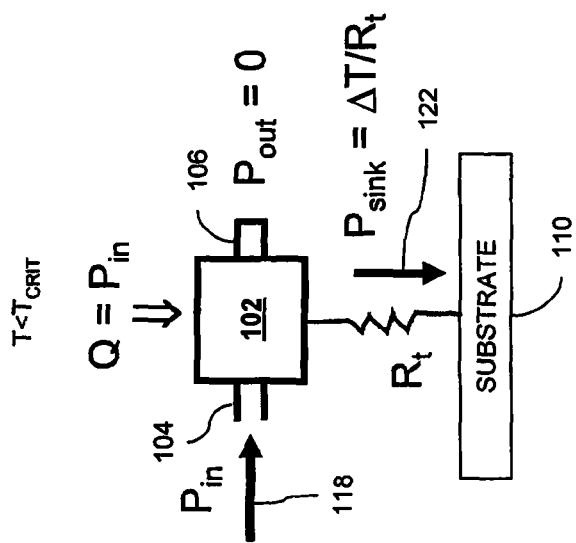

The operating conditions for steps 204-210 are illustrated in FIG. 3A. In this case, substantially all of input light 118 is converted into heat via thermal absorption element 114. Thus, substantially no light is transmitted out of output port 106, such that the output power $P_{out}$ is approximately 0. As shown in FIG. 3A, substantially all of input light 118 is converted to heat, such that $Q=P_{in}$ and substantially all of the heat may be transferred to substrate 110 as transferred heat 122. Accordingly, for a temperature T less than $T_{CRIT}$, the rate of change in temperature with respect to time t (at substrate 110) may be defined as:

$$\frac{dT}{dt} = \left[P_{in} - \frac{\Delta T}{R_t}\right] \cdot \frac{1}{C} > 0 \qquad (3)$$

where C represents the heat capacity of thermal control device 102.

Referring back to FIG. 2, at step 202, if it is determined that the operating point of optical filter is greater than or equal to critical temperature $T_{CRIT}$, step 202 proceeds to step 212. At step 212, optical filter 116 may block light from being coupled to thermal absorption element 114. At step 214, optical filter 116 may pass light out of thermal control device 102 via input/output waveguide 112, to provide output light 120. Step 214 may proceed to step 202.

The operating conditions for steps 212 and 214 are illustrated in FIG. 3B. As shown in FIG. 3B, substantially all of input light 118 passes through thermal control device 102 as output light 120. Thus, for temperatures greater than or equal to $T_{CRIT}$, heat Q is substantially 0. Accordingly, a minimum amount of heat 122' may be transferred to substrate 110. Ideally, for T greater than or equal to $T_{CRIT}$, the rate of change of temperature (at substrate 110) with respect to time t may be represented as:

$$\frac{dT}{dt} = -\frac{\Delta T}{R_t} \cdot \frac{1}{C} < 0. \qquad (4)$$

Referring generally to FIGS. 3A and 3B, for temperatures less than $T_{CRIT}$, thermal control device 102 may convert substantially all of the input light 118 to heat and provide transferred heat 122 to substrate 110. Thus, substrate 110 may absorb substantially all of the heat generated by input light 118. For temperatures greater than or equal to $T_{CRIT}$, substantially all of input light 118 is passed through thermal control device 102, allowing substrate 110 to passively cool down to below the critical temperature $T_{CRIT}$. Accordingly, the switching behavior by thermal control device 102 may passively control the temperature range of substrate 110 (as well as adjacent photonic devices and components thermally coupled to substrate 110).

Figure 4:
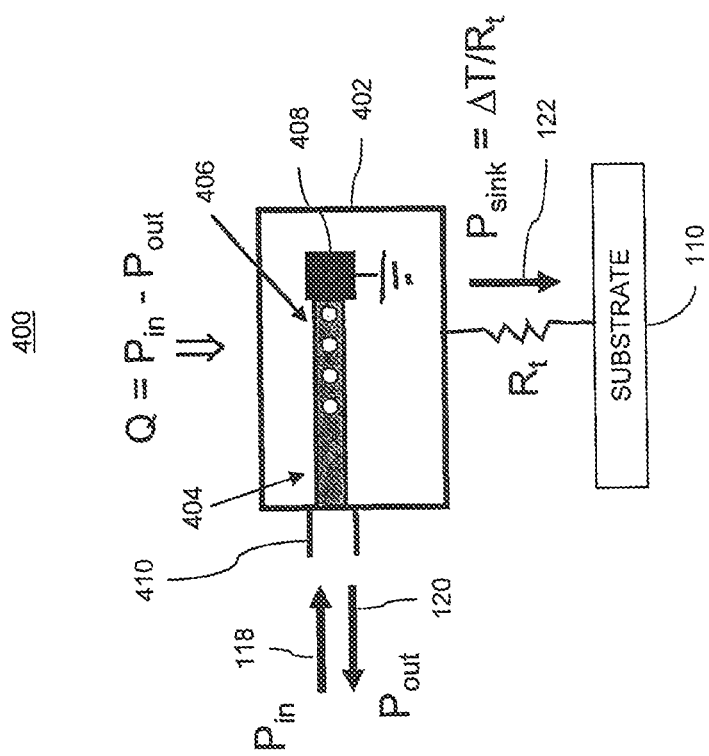
FIG. 4 is a schematic block diagram of an exemplary thermal control device of a photonic system, according to an embodiment of the present invention.

Referring next to FIGS. 4-5D, exemplary photonic system 400 is shown, according to an embodiment of the present invention. In particular, FIG. 4 is a schematic view diagram of photonic system 400; FIG. 5A is a perspective view diagram of thermal control device 402; FIG. 5B is a perspective view diagram of thermal control device 402'; FIG. 5C is a perspective view diagram of photonic system 400; and FIG. 5D is a cross-section diagram of photonic system 400.

Photonic system 400 includes thermal control device 402 thermally coupled to substrate 110 via thermal resistance $R_t$. Thermal control device 402 may include input/output waveguide section 404 optically coupled to input/output port 410. Thermal control device 402 may also include long-pass filter 406 and absorption section 408. Long-pass filter 406 may be optically coupled to both input/output waveguide section 404 and absorption section 408. Long-pass filter 406 may also be thermally coupled to absorption section 408. Thermal control device 402 is similar to thermal control device 102 of FIG. 1, where input/output port 410 represents input port 104 and output port 106, input/output waveguide section 404 represents input/output waveguide 112, long-pass filter 406 represents thermally tunable optical filter 116 and absorption section 408 represents thermal absorption element 114.

In operation, input light 118 may be transmitted through input/output waveguide section 404 to long-pass filter 406. Because long-pass filter 406 may be thermally coupled to absorption section 408, the operating point of long-pass filter 406 may change based on the heat converted by absorption section 408. Depending upon the operating point of long-pass filter 406, input light 118 may be passed to absorption section 408 via long-pass filter 406 or may be reflected by long-pass filter 406 (i.e., without being absorbed by absorption section 408) back through input/output waveguide section 404 via to provide output light 120 input/output port 410.

Referring to FIGS. 5A and 5B, thermal control devices 402 and 402' are shown. Thermal control devices 402, 402' may be formed from waveguide structure 502. Waveguide structure 502 may include a core layer having a refractive index ($n_c$) surrounded by a cladding layer having a refractive index ($n_{cl}$), where $n_c$ is greater than $n_{cl}$. Waveguide structure 502 may include, for example, germanium doped silicon oxide, silicon, germanium, gallium arsenide, indium phosphide, silica ($SiO_2$), fused quartz, sapphire, alumina, glass, silicon carbide, lithium niobate, silicon on insulator, germanium on insulator and silicon germanium. Typical cladding layer materials include, for example, air, polymer, silica ($SiO_2$) and doped silicas such as phosphosilicate glass (PSG), borosilicate glass (BSG), borophosphosilicate glass (BPSG) and fluorine doped silica (SiOF). In an exemplary embodiment, waveguide structure 502 may have a width (W) between about 300 nm to about 500 nm and may include a height (H) between about 180 nm to about 280 nm.

Absorption section 408 may be formed, for example, by doping a corresponding region of waveguide structure 502 (by implanting ions into waveguide structure 502) or by using a metal material to absorb and convert input light 118 to heat. Because absorption section 408 is thermally coupled to long-pass filter 406, the operating point of long-pass filter 406, 406' may be thermally tuned by absorption section 408.

Figure 6A:
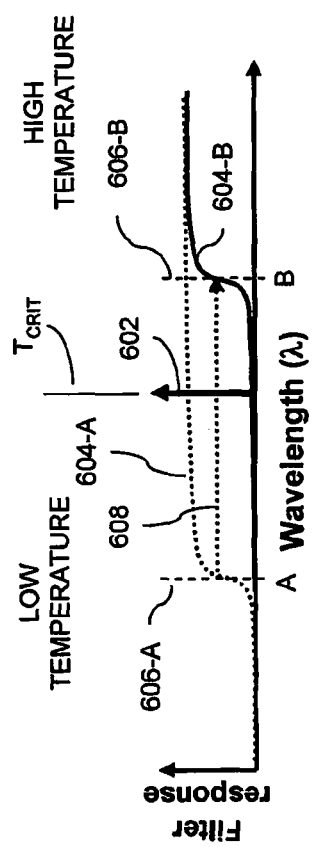
FIG. 6A is an example graph of an optical filter response as a function of a wavelength for the optical filter shown in FIG. 4, illustrating variation in the optical filter response with respect to variation in temperature, according to an embodiment of the present invention.

As described further with respect to FIG. 6A, long-pass filter 406 (and 406') may be configured to reflect shorter wavelengths of light and to pass (to absorption section 408) longer wavelengths of light. In FIG. 5A, long-pass filter 406 includes a plurality of periodically spaced holes 504, to form a Bragg reflector. Although holes 504 are illustrated (i.e., filled with air), holes 504 may be filled with a material having a different refractive index from that of waveguide structure 502. In general, long-pass filter 406 includes an alternating sequence of optical materials with different refractive indices, such that input light 118 is transmitted through long-pass filter 406 to absorption section 408 for longer wavelengths and is reflected by long-pass filter 406 as output light 120 for shorter wavelengths.

In FIG. 5B, long-pass filter 406' is similar to long-pass filter 406', except that long-pass filter 406' is formed as a photonic crystal filter by a plurality of photonic crystal cavities 506. According to another embodiment, long-pass filter 406 may include a thin film interference filter having a gap with no cavities. According to another embodiment, long-pass filter 406 may include a thin film interference filter. Suitable long-pass filters 406, 406' may be understood by the skilled person from the description herein.

Thermal control device 402 (402') may be produced by forming waveguide structure 502. A plurality of holes 504 (or photonic crystal cavities 506) may be formed in waveguide structure 502 (such as by photolithography) having a predetermined radius in spacing to form long-pass filter 406 (406'). Ions may be implanted into waveguide material to form absorption section 408.

As shown in FIGS. 5C and 5D, thermal control device 402, 402' may be suspended over substrate 110 and thermally coupled to substrate 110 by support structure 508. Support structure 508 represents thermal resistance $R_t$ (FIG. 4). Thermal control device 402, 402' may be spaced apart from substrate 110 by gap 510. Support structure 508 may be configured to provide a suitable thermal resistance to provide transferred heat 122 (FIG. 4) to substrate 110.

Figure 6B:
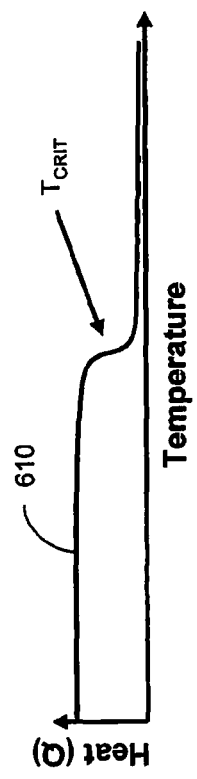
FIG. 6B is an example graph of transferred heat as a function of temperature for the thermal control device shown in FIG. 4, where the thermal control device includes the optical filter response shown in FIG. 6A, according to an embodiment of the present invention.

Referring to FIGS. 6A and 6B, thermal tuning of long-pass filter 406 is described. In particular, FIG. 6A is an example graph of long-pass filter response 604 as a function of wavelength for operation at low and high temperatures; and FIG. 6B is an example graph of the transferred heat 610 as a function of temperature, provided by thermal control device 402 for filter response 604.

As shown in FIG. 6A, input light 118 (FIG. 4) is illustrated as monochromatic light having wavelength 602. Long-pass filter response 604 includes band edge 606 such that wavelengths longer than band edge 606 are transmitted through long-pass filter 406 while wavelengths shorter than band edge 606 are reflected by long-pass filter 406. In FIG. 6A, band edge 606 represents the operating point of long-pass filter 406.

Band edge 606 shifts in direction 608 as long-pass filter 406 is heated from a low temperature to a high temperature. Thus, filter response 604-A having band edge 606-A at wavelength A represents a low temperature response of long-pass filter 406. Filter response 604-B having band edge 606-B at wavelength B represents a high temperature response of long-pass filter 406.

As shown in FIGS. 6A and 6B, as long as band edge 606 is less than wavelength 602 of input light 118 (FIG. 4), input light 118 may be passed to absorption section 408. Accordingly, heat 610 absorbed by absorption section 408 may be transferred to substrate 110. When band edge 606 is greater than the wavelength 602 of input light 118 (FIG. 4), (such as band edge 606-B) input light 118 may be reflected out of input/output port 410 as output light 120. Accordingly, above critical temperature $T_{CRIT}$, band edge 606 is above wavelength 602, illustrating that a substantially minimal amount of heat 610 may be transferred to substrate 110 (FIG. 4). Thus, above critical temperature $T_{CRIT}$, the limited amount of heat 610 transferred to substrate 110 (FIG. 4) may allow photonic system 400 (i.e., both thermal control device 402 and substrate 110) to passively cool down.

In general, filter response 604, a sensitivity of band edge 606 to changes in temperature and the amount of heat dissipated from thermal control device 402 (402') (FIGS. 4-5D) to substrate 110 may be controlled by the spacing and radius of holes 504 (photonic cavities 506) as well as the doping concentration of absorption section 408 and the thermal resistance $R_t$. Thus, suitable variation of these different design parameters may be used to control the amount of heat provided to substrate 110 as well as the range of temperatures for stabilizing substrate 110.

Figure 7:
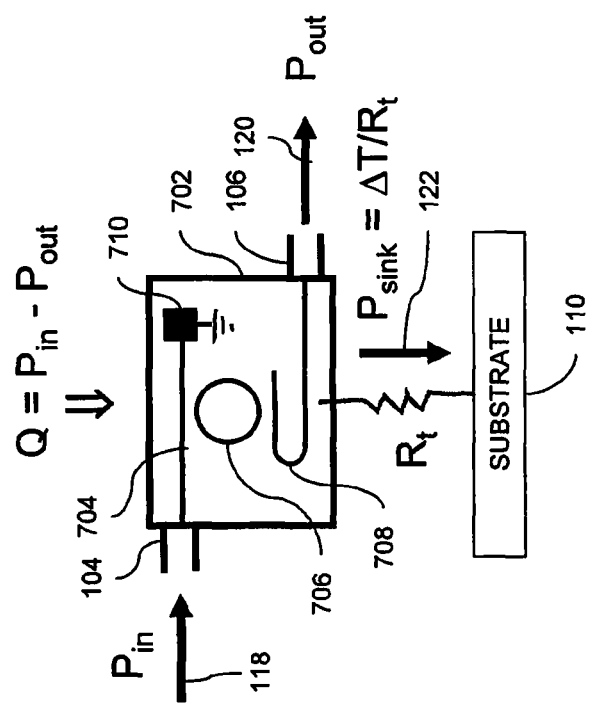
FIG. 7 is a schematic view diagram of an exemplary thermal control device of a photonic system, according to another embodiment of the present invention.
Figure 8:
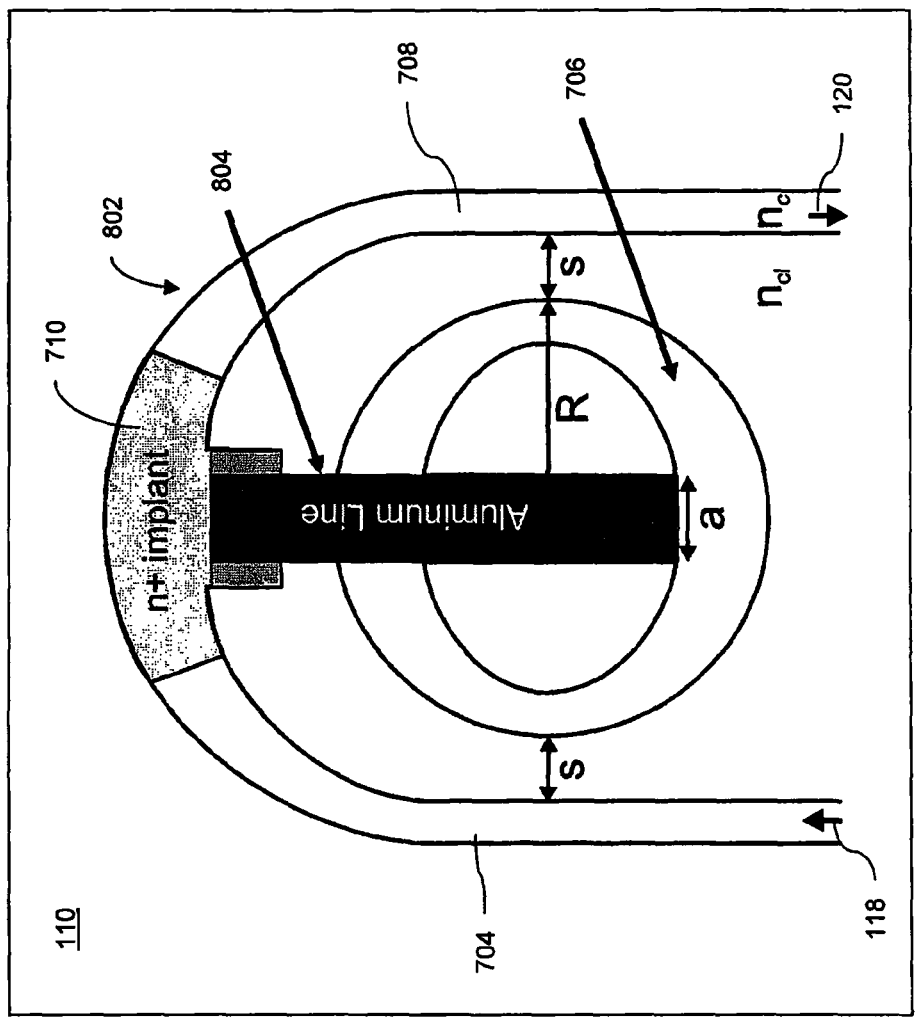
FIG. 8 is an overhead view diagram of the thermal control device shown in FIG. 7, according to an embodiment of the present invention.

Referring next to FIGS. 7 and 8, exemplary photonic system 700 is shown, according to another embodiment of the present invention. In particular, FIG. 7 is a schematic view diagram of photonic system 700; and FIG. 8 is an overhead view diagram of thermal control device 702.

Photonic system 700 includes thermal control device 702 thermally coupled to substrate 110 via thermal resistance $R_t$. Thermal control device 702 may include input waveguide 704, resonator filter 706, output waveguide 708 and absorption section 710. Input waveguide 704 may be optically coupled to input port 104 for receiving input light 118. Output waveguide 708 may be optically coupled to output port 106 for passing output light 120. Resonator filter 706 may be optically (evanescently) coupled to input waveguide 704 and output waveguide 708. Resonator filter may be thermally coupled to absorption section 710. Thermal control device 702 is similar to thermal control device 102 of FIG. 1, where input waveguide 704 and output waveguide 708 correspond with input/output waveguides 112, resonator filter 706 corresponds with thermally tunable optical filter 116 and absorption section 710 corresponds with thermal absorption element 114.

Resonator filter 706 absorbs light at a resonance wavelength (within a resonance wavelength band). In operation, if input light 118 in input waveguide 704 has a wavelength that is at the resonance wavelength (on resonance with) of resonator filter 706, input light 118 may be evanescently coupled to resonator filter 706 and may be evanescently coupled out of resonator filter 706 to output waveguide 708. If input light 118 in input waveguide 704 has a wavelength that is off the resonant wavelength (off resonance), input light 118 is not coupled to resonator filter 706. Instead, input light 118 propagates from input waveguide 704 to absorption section 710.

As shown in FIG. 8, thermal control device 702 may include waveguide structure 802 having input waveguide 704, output waveguide 708 and absorption section 710. Absorption section 710 may be formed by doping a corresponding portion of waveguide structure 802, such as by n+ ion implantation. Waveguide structure 802 may include a core layer having refractive index $n_c$ which may be surrounded by cladding layer having refractive index $n_{cl}$. In FIG. 8, the cladding layer is illustrated as being air. In general, the core and cladding layers may be formed of any suitable material, as described above, such that refractive index $n_c$ is greater than refractive index $n_{cl}$.

Resonator filter 706 includes a microring having radius R and may be spaced apart from input waveguide 704 and output waveguide 708 by distance s. Absorption section 710 may be thermally coupled to resonator filter 706 by thermal conductive element 804. In FIG. 8, element 804 is illustrated as an aluminum connector but may include any suitable element capable of thermally conducting heat from absorption section 710 to resonator filter 706. A width (a) of thermal conductive element 804 may be selected to provide a predetermined amount of heat to resonator filter 706. Thus, a sensitivity of resonator filter 706 to temperature may be controlled, at least in part, by a size of thermal conductive element 804. In an exemplary embodiment, radius R of resonator filter 706 is between about 3 μm to about 400 μm, width a of thermal conductive element 804 is between about 100 nm to about 10 μm and distance s between resonator filter 706 and waveguides 704, 708 is between about 200 nm to about 3 μm.

Resonator filter 706 has a resonance wavelength given as:

$$\lambda = 2\pi R n_c / i \quad (5)$$

where i is any positive integer. Although FIG. 8 illustrates a ring-resonator filter 706 having a circular symmetry, resonator filter 706 may include any microresonator capable of optically coupling light between input waveguide 704 and output waveguide 708, including, but not limited to oval, elliptical and racetrack microresonators. Resonator filter 706 and waveguide structure 802 may be formed of materials similar to those described above with respect to waveguide structure 502 (FIG. 5A).

Although not shown, thermal control device 702 may be spaced apart from substrate 110 and thermally coupled to substrate 110 by one or more support structures, similar to support structure 508 shown in FIGS. 5C and 5D.

Figure 9A:
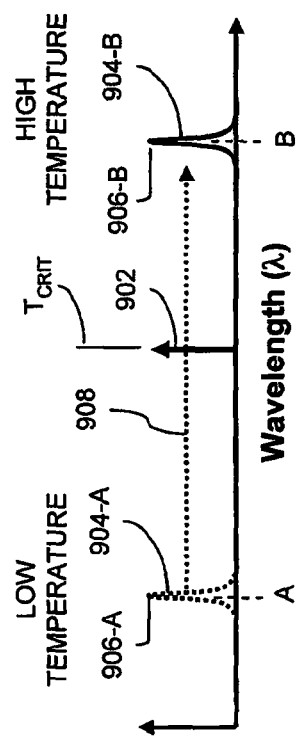
FIG. 9A is an example graph of an optical filter response as a function of a wavelength for the optical filter shown in FIG. 7, illustrating variation in the optical filter response with respect to variation in temperature, according to an embodiment of the present invention.
Figure 9B:
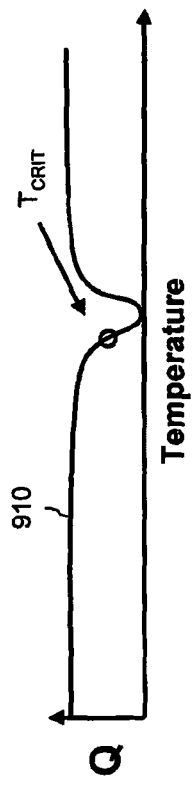
FIG. 9B is an example graph of transferred heat as a function of temperature for the thermal control device shown in FIG. 7, where the thermal control device includes the optical filter response shown in FIG. 9A, according to an embodiment of the present invention.

Referring next to FIGS. 8, 9A and 9B, thermal tuning of resonator filter 706 is described. In particular, FIG. 9A is an example graph of resonator filter response 904 as a function of wavelength for operation at low and high temperatures; and FIG. 9B is an example graph of transferred heat 910 as a function of temperature, provided by thermal control device 702 for filter response 904.

As shown in FIG. 9A, input light 118 (FIG. 7) is illustrated as monochromatic light having wavelength 902. Filter response 904 includes resonance wavelength 906, where resonance wavelength 906 represents the operating point of resonator filter 706 (FIG. 7). Resonance wavelength 906 shifts along direction 908 as resonator filter 706 (FIG. 7) is heated from a low temperature to high temperature. Accordingly, resonance wavelength 906 may increase with increasing temperature.

Filter response 904-A having resonance wavelength 906-A at wavelength A represents a low temperature response of resonator filter 706 (FIG. 7). Thus, at low temperature, filter response 904-A is off resonance with wavelength 902. Filter response 904-B having resonance wavelength 906-B at wavelength B represents a high temperature response of resonator filter 706 (FIG. 7), which may also be off resonance with wavelength 902. However, at some position along direction 908, resonance wavelength 906 may overlap with wavelength 902, thus coupling input light 118 (FIG. 7) into resonator filter 706.

As shown in FIGS. 9A and 9B, as long as wavelength 902 is off resonance with resonance wavelength 906, input light 118 (FIG. 7) may be converted to heat by absorption section 710, such that heat 910 may be transferred to substrate 110. At critical temperature $T_{CRIT}$, wavelength 902 may be on resonance with resonance wavelength 906, so that a substantially minimum amount of heat 610 may be transferred to substrate 110 (FIG. 7).

Figure 10:
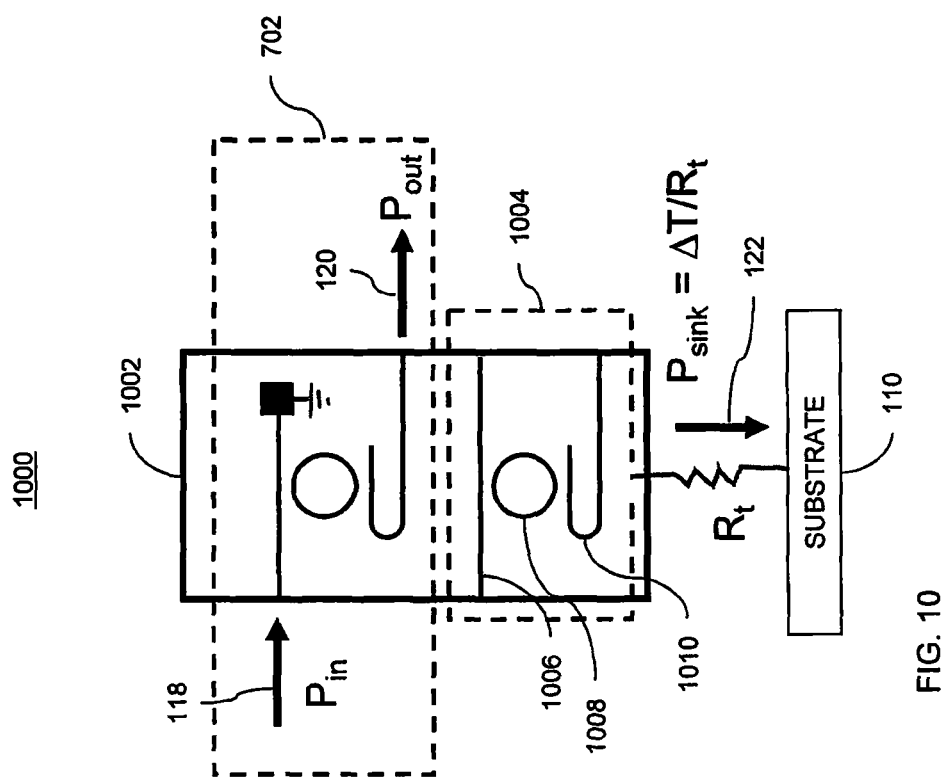
FIG. 10 is a schematic view diagram of an exemplary photonic system, according to another embodiment of the present invention.

Referring next to FIG. 10, exemplary photonic system 1000 is shown. Photonic system 1000 includes local isothermal region 1002 having thermal control device 702 and passive photonic device 1004. Isothermal region 1002 may represent an additional substrate layer and may be thermally coupled to substrate 110 via thermal resistance $R_t$. Isothermal region 1002 may be formed, for example, by a layer of crystalline silicon or polycrystalline silicon or a metal conductor that thermally connects thermal control device 702 and photonic device 1004 together.

In this example, photonic device 1004 represents a microresonator filter and may include input waveguide 1006, resonator filter 1008 and output waveguide 1010. Although photonic device 1004 is illustrated as a microresonator filter, photonic device 1004 may include any photonic device, photonic element or other component which may be passively thermally controlled by thermal control device 702.

Because photonic device 1004 and thermal control device 702 may be disposed in local isothermal region 1002, heat generated by thermal control device 702 may be used to control the resonance frequency (i.e., operating point) of adjacent microcavities, such as resonator filter 1008. Thus, thermal control device 702 may operate similarly to a heat engine to provide temperature stabilization of photonic device 1004. It is understood that the operating point and the filter characteristics of thermal control device 702 may be different from an operating point and filtering characteristics of photonic device 1004. However, the heat generated by thermal control device 702 may be used to thermally lock photonic device 1004 to input light 118.

Although photonic elements across a photonic chip may have very different resonance frequencies, (due to the lithographic fabrication of the photonic components), photonic elements that are adjacent to each other are typically fabricated with substantially identical wavelength resonances. Thus, thermal control device 702 may be used to control a plurality of photonic devices 1004 within local isothermal region 1002. Accordingly, thermal control device 702 may be used to thermally lock adjacent microcavities on resonance with the control input light 118. Thus, a plurality of adjacent photonic devices 1004 may be maintained at a same temperature to maintain the devices at their respective operating points.

Although FIG. 1 illustrates thermal control device 102 having a single thermal absorption element 114 and a single thermally tunable optical filter 116, thermal control device 102 may include a plurality of optical filters and thermal absorption elements.

Figure 11:
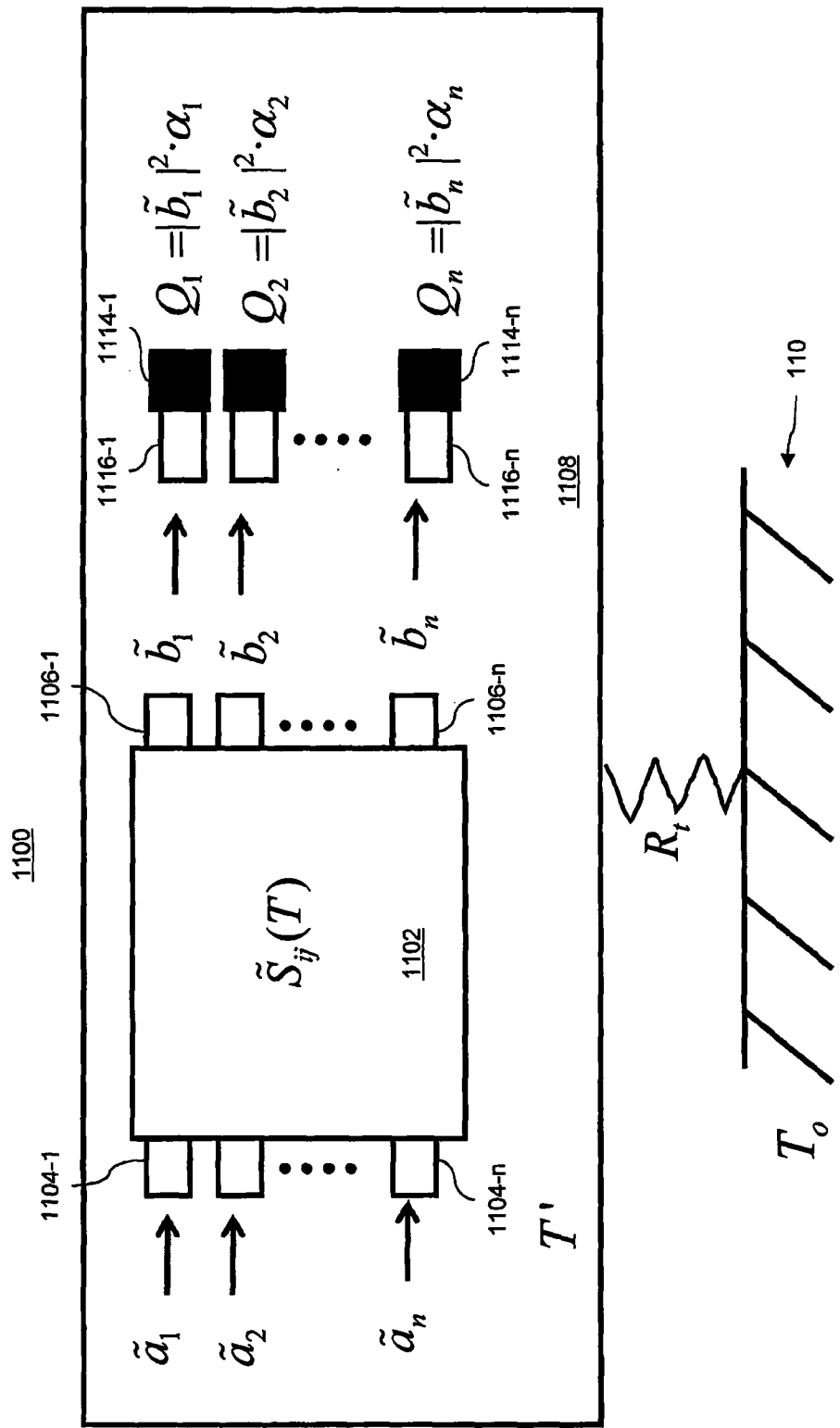
FIG. 11 is a schematic view diagram of an exemplary photonic system including a multi-port thermal controller, according to another embodiment of the present invention.

Referring to FIG. 11, photonic system 1100 including multi-port thermal controller 1102 is shown, according to an example embodiment. Multi-port thermal controller 1102 may be disposed on isothermal region 1108 to produce equilibrium temperature T'. Isothermal region 1108 may be thermally coupled to substrate 110 at substrate temperature $T_o$ via thermal resistance $R_t$.

Multi-port thermal controller 1102 may include plural input ports 1104-1, ..., 1104-$n$ and plural respective output ports 1106-1, ..., 1106-$n$. Input light $\tilde{a}_1$, ..., $\tilde{a}_n$ may be received by respective input ports 1104-1, ... 1104-$n$ (where input light $\tilde{a}$ represents monochromatic light) and may be provided to respective optical filters 1116-1, ..., 1116-$n$ and absorption elements 1114-1, ..., 1114-$n$. Depending upon the respective operating points of optical filters 1116, controller 1102 may pass output light $\tilde{b}_1$, ..., $\tilde{b}_n$ via respective output ports 1106-1, ..., 1106-$n$ or may transfer respective heat $Q_1$, ..., $Q_n$ to substrate 110. Although not shown, it is understood that controller 1102 may include input/output waveguides for transferring light between respective input ports 1104 and output ports 1106. For convenience, optical filters 1116 and absorption elements 1114 are illustrated external to controller 1102. In practice, optical filter 1116 and absorption element 1114 may be internal to controller 1102 and may be coupled to input/output waveguides of controller 1102 as described herein.

In general, each optical filter 1116 and absorption element 1114 may be designed to dissipate a different rate of power (i.e., heat $Q_i$) within controller 1102. A general relationship between heat $Q_i$, input light $\tilde{a}_i$ and output light $\tilde{b}_i$ for respective optical filter 1116-$i$ and absorption element 1114-$i$ may be given as:

$$Q_i = |\tilde{b}_i|^2 \cdot \alpha_i \quad (6)$$

where $\alpha_i$ represents an absorption fraction of absorption element 1114-$i$.

The general response of the system may be represented as $\tilde{S}_{ij}(T)$ at temperature T. The light output from port 1106-$i$ at temperature T may be represented as:

$$\tilde{b}_i(T) = \tilde{S}_{ij}(T) \cdot \alpha_j \quad (7)$$

A desired equilibrium temperature T' of isothermal region 1108 may be obtained by combining multiple optical filters 1116 and absorption elements 1114. In general, equilibrium temperatures T' may be selected as:

$$T' = T_o + \Delta T = T_o + \sum_{i=1}^{n} Q_i / R_t \quad (8)$$

such that the steady state response of the system may be given at $\tilde{S}_{ij}(T')$. Although FIG. 11 relates to a monochromatic input light, the same principles described above may be extended to a superposition of monochromatic sources.

Figure 12:
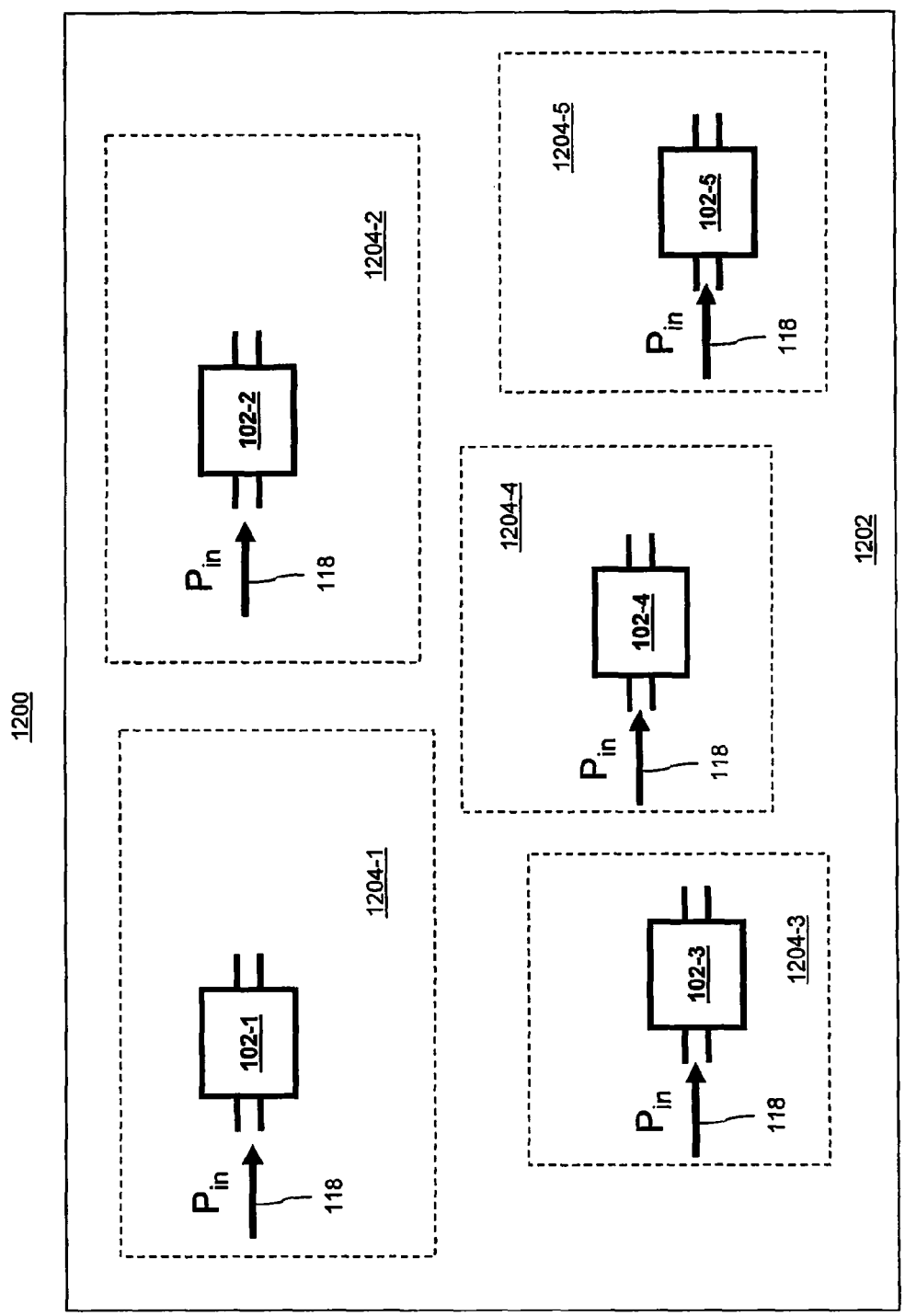
FIG. 12 is a schematic view diagram of an exemplary photonic system including a plurality of thermal control devices, according to another embodiment of the present invention.

Referring next to FIG. 12, photonic system 1200 is shown. Photonic system 1200 includes a plurality of thermal control devices 102 controlling respective local isothermal regions 1204 on photonic chip 1202. Although not shown, each isothermal region 1204 may include one or more photonic devices or other components which may also be controlled by respective thermal control device 102, as described above with respect to FIG. 10. Each thermal control device 102 may be designed for critical temperatures associated with respective isothermal regions 1204, where the critical temperatures may be different. Thus, the plurality of thermal control devices 102 may be used to stabilize the temperature across photonic chip 1202.

Accordingly, a sensitivity of each thermal control device 102 to change in temperature may be designed according to the temperature stabilization needs of respective isothermal regions 1204. Although thermal control devices 102 are illustrated in FIG. 12, photonic system 1200 may also include one or more multi-port thermal controllers 1102 (FIG. 11).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A thermal control device thermally coupled to a substrate comprising:
    a waveguide for receiving light;
    an absorption element, optically coupled to the waveguide, for converting the received light to heat; and
    an optical filter optically coupled to the waveguide and thermally coupled to the absorption element, an operating point of the optical filter being tuned responsive to the heat from the absorption element,
    wherein, when the operating point of the optical filter is less than a predetermined temperature, the received light is passed to the absorption element via the optical filter, and
    when the operating point of the optical filter is greater than or equal to the predetermined temperature, the received light is transmitted out of the thermal control device via the optical filter, without being passed to the absorption element.

2. The thermal control device according to claim 1, wherein the light is converted to heat by the absorption element and is transferred to the substrate when the operating point of the optical filter is less than the predetermined temperature.

3. The thermal control device according to claim 1, wherein the operating point of optical filter is tuned relative to at least one wavelength of the received light and the predetermined temperature is associated with the at least one wavelength of the received light.

4. The thermal control device according to claim 1, wherein the thermal control device is thermally coupled to the substrate via a thermal resistance.

5. The thermal control device according to claim 1, wherein the optical filter includes a plurality of optical filters and the absorption element includes a plurality of absorption elements thermally coupled to the respective plurality of optical filters, and
    a combination of the plurality of absorption elements are configured to convert the received light into a predetermined amount of heat.

6. The thermal control device according to claim 1, wherein:
    the optical filter includes a long-pass filter, a band edge of the long-pass filter corresponding to the operating point,
    the absorption element is disposed adjacent to the long-pass filter and is optically coupled to the long-pass filter, and
    the long-pass filter is disposed between the waveguide and the absorption element, such that the received light is transmitted out of the thermal control device via the waveguide, when the band edge of the long-pass filter is greater than or equal to the predetermined temperature.

7. The thermal control device according to claim 6, wherein the long-pass filter includes at least one of a Bragg reflector, a photonic crystal filter or a thin film interference filter.

8. The thermal control device according to claim 6, wherein the absorption element includes at least one of a doped waveguide structure or a thermally conductive element.

9. The thermal control device according to claim 6, wherein:
    the band edge of the long-pass filter is greater than a wavelength of the received light when the long-pass filter is greater than or equal to the predetermined temperature, and
    the band edge of the long-pass filter is less than the wavelength of the received light when the long-pass filter is less than the predetermined temperature.

10. The thermal control device according to claim 1, wherein:
    the optical filter includes a microresonator filter, a resonance wavelength band of the microresonator filter corresponding to the operating point,
    the absorption element is disposed adjacent to the waveguide, and
    the microresonator filter is disposed between the waveguide and a further waveguide, such that the received light is transmitted out of the thermal control device via the further waveguide, when the resonance wavelength band of the microresonator filter is greater than or equal to the predetermined temperature.

11. The thermal control device according to claim 10, wherein the microresonator filter includes at least one of a ring microresonator, an oval microresonator, an elliptical microresonator or a racetrack microresonator.

12. The thermal control device according to claim 10, wherein the absorption element includes a doped waveguide structure and a thermally conductive element coupled between the doped waveguide structure and the microresonator filter.

13. The thermal control device according to claim 10, wherein:
    a wavelength of the received light is on resonance with the resonance wavelength band of the microresonator filter when the resonance wavelength band is greater than or equal to the predetermined temperature, and
    the wavelength of the received light is off resonance with the resonance wavelength band of the microresonator filter when the resonance wavelength is less than the predetermined temperature.

14. A photonic system comprising:
    a light source for generating light having at least one wavelength; and
    a thermal control device thermally coupled to an isothermal region of a photonic chip, the thermal control device comprising:
        an optical filter configured to receive the light from the light source, and
        an absorption element for converting the received light to heat, the optical filter thermally coupled to the absorption element, an operating point of the optical filter being tuned responsive to the heat from the absorption element to selectively transfer heat from the absorption element to the isothermal region,
    wherein, when the operating point of the optical filter is less than a predetermined temperature, the received light is passed to the absorption element via the optical filter, and
    when the operating point of the optical filter is greater than or equal to the predetermined temperature, the received light is transmitted out of the thermal control device via the optical filter, without being passed to the absorption element.

15. The photonic system according to claim 14, wherein the operating point of optical filter is tuned relative to the at least one wavelength of the light and the predetermined temperature is associated with the at least one wavelength of the light.

16. The photonic system according to claim 14, wherein the photonic system includes at least one photonic element thermally coupled to the isothermal region, the thermal control device transferring the heat to the at least one photonic element.

17. The photonic system according to claim 16, wherein the thermal control device passively controls an operating point of the photonic element.

18. The photonic system according to claim 14, wherein the thermal control device includes a plurality of thermal control devices thermally coupled to a respective plurality of isothermal regions of the photonic chip.

19. The photonic system according to claim 14, wherein the optical filter includes a plurality of optical filters and the absorption element includes a plurality of absorption elements thermally coupled to the respective plurality of optical filters, and
    a combination of the plurality of absorption elements are configured to convert the received light into a predetermined amount of heat.

20. The photonic system according to claim 14, wherein the optical filter includes a long-pass filter, a band edge of the long-pass filter corresponding to the operating point.

21. The photonic system according to claim 14, wherein the optical filter includes a microresonator filter, a resonance wavelength of the microresonator filter corresponding to the operating point.

22. A method of stabilizing a temperature of a photonic system comprising:
    receiving light by an optical filter;
    selectively passing the received light to an absorption element responsive to an operating point of the optical filter, the optical filter thermally coupled to the absorption element such that the operating point of the optical filter is tuned responsive to heat from the absorption element;

when the operating point of the optical filter is less than a predetermined temperature:
  passing the received light to the absorption element via the optical filter, and
  converting the received light to the heat by the absorption element to transfer heat to the photonic system; and
when the operating point of the optical filter is greater than or equal to the predetermined temperature:
  transmitting the received light out of the photonic system via the optical filter, without passing the received light to the absorption element, to reduce the temperature of the photonic system.

23. The method according to claim 22, wherein the tuning of the operating point of optical filter includes tuning the operating point relative to a wavelength of the received light, the predetermined temperature being associated with the wavelength of the received light.

24. The method according to claim 22, wherein the transferring of the heat to the photonic system including transferring the heat to an isothermal region of the photonic system via a thermal resistance.

25. The method according to claim 22, wherein the photonic system includes at least one photonic element thermally coupled to an isothermal region of the photonic system, the transferring of the heat to the photonic system including transferring the heat to the at least one photonic element.

26. The method according to claim 22, wherein the optical filter includes a plurality of optical filters and the absorption element includes a plurality of absorption elements thermally coupled to the respective plurality of optical filters, and
  an absorption fraction of each absorption element is selected such that a combination of the plurality of absorption elements convert the received light into a predetermined amount of heat.

* * * * *